United States Patent [19]

Kanami

[11] Patent Number: 5,613,226
[45] Date of Patent: Mar. 18, 1997

[54] LINEAR TRANSMITTER FOR USE IN COMBINATION WITH RADIO COMMUNICATION SYSTEMS

[75] Inventor: Shuji Kanami, Tokyo, Japan

[73] Assignee: NEC Corporation, Tokyo, Japan

[21] Appl. No.: 350,056

[22] Filed: Nov. 29, 1994

[30] Foreign Application Priority Data

Nov. 30, 1993 [JP] Japan ..................................... 5-299287
Nov. 30, 1993 [JP] Japan ..................................... 5-299338

[51] Int. Cl.$^6$ ........................................................ H04J 4/00
[52] U.S. Cl. ........................... 455/115; 455/126; 330/129
[58] Field of Search ..................... 455/115, 126, 455/127, 119; 330/2, 129; 375/297; 370/95.3

[56] References Cited

U.S. PATENT DOCUMENTS

| | | | |
|---|---|---|---|
| 5,066,923 | 11/1991 | Gailus et al. ........................... | 330/107 |
| 5,134,718 | 7/1992 | Gailus ..................................... | 455/102 |
| 5,381,108 | 1/1995 | Whitmarsh et al. ................... | 330/2 |
| 5,483,681 | 1/1996 | Bergsten et al. ....................... | 455/126 |

*Primary Examiner*—Reinhard J. Eisenzopf
*Assistant Examiner*—Philip J. Sobutka
*Attorney, Agent, or Firm*—Sughrue, Mion, Zinn, Macpeak & Seas

[57] ABSTRACT

In a linear transmitter (20) for use in combination with a radio communication system of TDMA that has a plurality of radio stations each of which has the linear transmitter, the linear transmitter is supplied with an input signal having a preamble at a first period and an information signal at a second period following the first period. The linear transmitter comprises a switching circuit (21) for supplying a quadrature modulator circuit (14) with the input signal during the first period. The switching circuit supplies the quadrature modulator circuit with a difference signal of a differential amplifier (13) which is supplied with the input signal. A quadrature demodulator (18) quadrature demodulates a transmission signal into a feedback signal having feedback inphase and feedback quadrature components in accordance with a phase adjusted carrier signal which is supplied from a phase adjusting circuit (23). A monitoring circuit (22) monitors a level of the feedback quadrature component during the first period to produce a level monitored signal representative of a monitored level. The phase adjusting circuit adjusts a carrier phase of a carrier signal in accordance with the level monitored signal during the first period to produce a phase adjusted carrier signal. The phase adjusting circuit supplies the phase adjusted carrier signal to the quadrature demodulator.

16 Claims, 5 Drawing Sheets

LINEAR TRANSMITTER FOR USE IN COMBINATION WITH RADIO COMMUNICATION SYSTEMS

BACKGROUND OF THE INVENTION

This invention relates to a linear transmitter for use in combination with a radio communication system of time division multiple access (TDMA).

In general, a radio communication system using time division multiple access (TDMA) comprises a relay station and a plurality of radio stations which communicate with one another through the relay station. In the radio communication system of TDMA, one of time slots is assigned as a specific time slot to a specific one of the radio stations. When the specific radio station transmits a transmission signal to the relay station in the specific time slot, the specific radio station transmits the transmission signal as a burst signal to the relay station as known in the art.

Each of the radio stations may be used as one of a fixed station and a mobile station. The mobile station may be carried by an automobile, a human being, or the like and has a variable location. Each of the radio stations comprises a linear transmitter for transmitting the transmission signal to the relay station in order to improve a non-linear distortion of the transmission signal. The linear transmitter produces the transmission signal having transmission inphase and transmission quadrature components in accordance with an input signal having input inphase and input quadrature components during a predetermined period. The predetermined period may be called a burst period.

In general, the linear transmitter implements a linear power amplifier to amplify a modulated signal which has a time varying amplitude (magnitude) for transmission. It is desirable for the linear power amplifier to provide good linearity and efficient power conversion. It is necessary to further reduce an amplifier distortion in the linear power amplifier. In order to reduce the amplifier distortion, the linear transmitter uses a negative feedback loop on which a feedback signal passes. The feedback signal has feedback inphase and feedback quadrature components. A cartesian loop is a known method for implementing the negative feedback loop around the linear power amplifier. A net phase shift around the cartesian loop must be maintained about 180 degrees at a desired channel frequency in order to insure stable operation.

However, the cartesian loop becomes unstable when a phase shift occurs between the input signal and the feedback signal. When the phase shift occurs between the input signal and the feedback signal, the cartesian loop may become to a positive feedback loop. Such a phase shift occurs on the basis of a time delay in the cartesian loop and the other factors. When the cartesian loop becomes unstable, it is difficult to reduce the amplifier distortion.

Furthermore, the linear transmitter generally has a transmitter offsets inherent in the transmitter as will be later described. On the basis of the transmitter offset, it is difficult to obtain a good modulation characteristic.

SUMMARY OF THE INVENTION

It is therefore an object of this invention to provide a linear transmitter capable of always reducing an amplifier distortion.

It is another object of this invention to provide a linear transmitter capable of obtaining a good modulation characteristic.

Other objects of this invention will become clear as the description proceeds.

On describing the gist of the invention, it is possible to understand that a linear transmitter for use in combination with a radio communication system of time division multiple access that has a plurality of radio stations each of which has the linear transmitter. The linear transmitter is for producing a transmission signal having transmission inphase and quadrature components in accordance with an input signal having input inphase and quadrature components during a predetermined period.

According to an aspect of this invention, the input signal has a preamble signal at a first period and an information signal at a second period following the first period. The preamble signal has preamble inphase and quadrature components. The information signal has information inphase and quadrature components. The linear transmitter comprises (A) quadrature modulating means for quadrature modulating a carrier signal by a supplied signal therein to produce the transmission signal, (B) differential amplifier means supplied with the input signal and a feedback signal having feedback inphase and quadrature components for producing a difference signal having difference inphase and quadrature components, (C) supplying means for supplying the preamble signal as the supplied signal to the quadrature modulating means during the first period, the supplying means supplying the difference signal as the supplied signal to the quadrature modulating means during the second period, (D) quadrature demodulating means supplied with the transmission signal for quadrature demodulating the transmission signal into a demodulated signal in accordance with the carrier signal to produce the demodulated signal as the feedback signal, (E) monitoring means for monitoring a level of the feedback quadrature component to produce a level monitored signal representative of a monitored level, and (F) phase adjusting means for adjusting a carrier phase of the carrier signal to produce an adjusted carrier signal during the first period in accordance with the level monitored signal, the phase adjusting means supplying the adjusted carrier signal as the carrier signal to the quadrature demodulating means.

According to another aspect of this invention, the linear transmitter comprises (G) quadrature modulating means for quadrature modulating a supplied signal therein into the transmission signal, (H) differential amplifier means having an amplifier offset inherent in the differential amplifier means for producing a difference signal having difference inphase and quadrature components in accordance with the input signal and a feedback signal having feedback inphase and quadrature components, (I) quadrature demodulating means having a demodulation offset inherent in the quadrature demodulating means for quadrature demodulating the transmission signal into a demodulated signal to produce the demodulated signal as the feedback signal, (J) monitoring means for monitoring a level of the difference signal during a waiting period except the predetermined period to produce a level monitored signal representative of a monitored level, and (K) offset adjusting means for adjusting the amplifier and the demodulation offsets during the waiting period in accordance with the level monitored signal.

DESCRIPTION OF THE PREFERRED EMBODIMENTS

Figure 1:
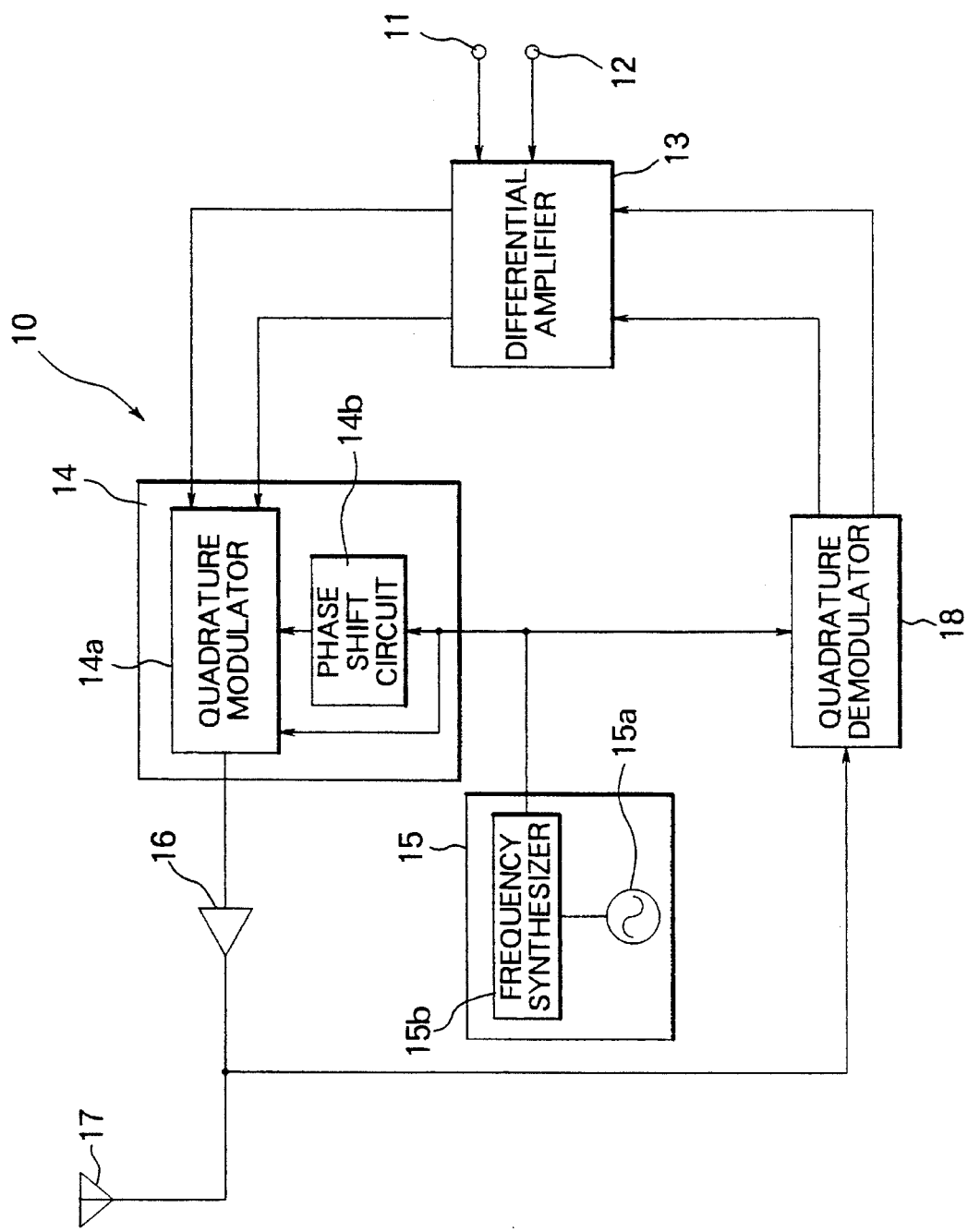
FIG. 1 is a block diagram of a conventional linear transmitter.

Referring to FIG. 1, a conventional linear transmitter will be described at first in order to facilitate an understanding of this invention. The illustrated linear transmitter 10 is for use in combination with a radio communication system of time division multiple access (TDMA) that comprises a plurality of radio stations. More particularly, each of the radio stations has the linear transmitter 10. The radio communication system may further comprise a relay station through which the radio stations communicate with one another. Each of the radio stations may be used as one of a fixed station and a mobile station. The mobile station may be carried by an automobile, a human being, or the like and has a variable location.

In the radio communication system of TDMA, one of time slots is assigned as a specific time slot to a specific one of the radio stations. When the specific radio station transmits a transmission signal to the relay station in the specific time slot by the use of the linear transmitter 10, the specific radio station transmits the transmission signal as a burst signal to the relay station as known in the art.

The linear transmitter 10 has first and second input terminals 11 and 12 each of which is connected to a differential amplifier 13. Through the first and the second input terminals 11 and 12, the differential amplifier 13 is supplied with an input signal having input inphase and input quadrature components. More specifically, the input inphase component is supplied to the differential amplifier 13 through the first input terminal 11. The input quadrature component is supplied to the differential amplifier 13 through the second input terminal 12.

The input signal has a preamble signal at a first period and an information signal at a second period following the first period. The preamble signal has preamble inphase and preamble quadrature components. Similarly, the information signal has information inphase and information quadrature components. The sum of the first and the second periods corresponds to a burst transmission period during which the burst signal is transmitted to the relay station.

The differential amplifier 13 is further supplied with a feedback signal having feedback inphase and feedback quadrature components, which will later be described. The differential amplifier 13 carries out subtraction of the input signal and the feedback signal to produce a difference signal having difference inphase and difference quadrature components. More particularly, the differential amplifier 13 carries out subtraction of the input inphase component and the feedback inphase component to produce the difference inphase component. Similarly, the differential amplifier 13 carries out subtraction of the input quadrature component and the feedback quadrature component to produce the difference quadrature component. The difference signal is supplied to a quadrature modulator circuit 14.

The quadrature modulator circuit 14 is connected to a carrier signal producing circuit 15 which produces a carrier signal having a carrier frequency. The carrier signal producing circuit 15 comprises a local oscillator 15a and a frequency synthesizer 15b. The local oscillator 15a generates an oscillation signal having a predetermined frequency. Supplied with the oscillation signal, the frequency synthesizer 15b produces the carrier signal. The carrier signal is supplied to the quadrature modulator circuit 14.

Supplied with the carrier signal, the quadrature modulator circuit 14 quadrature modulates the carrier signal by the difference signal to produce a modulated signal having modulated inphase and modulated quadrature components. More specifically, the quadrature modulator circuit 14 comprises a quadrature modulator 14a and a phase shift circuit 14b. The phase shift circuit 14b shifts a phase of the carrier signal by 90 degrees to produce a phase shifted carrier signal. The carrier signal and the phase shifted carrier signal are supplied to the quadrature modulator 14a. The quadrature modulator 14a amplitude modulates the carrier signal by the difference inphase component to produce the modulated inphase component. Similarly, the quadrature modulator 14a amplitude modulates the phase shifted carrier signal by the difference quadrature component to produce the modulated quadrature component. The modulated signal is supplied to a linear power amplifier 16.

The linear power amplifier 16 amplifies the modulated signal into an amplified signal. The amplified signal is transmitted as the transmission signal to the relay station through an antenna 17.

The amplified signal is further supplied to a quadrature demodulator 18. The quadrature demodulator 18 demodulates the amplified signal into a demodulated signal in accordance with the carrier signal supplied from the carrier signal producing circuit 15. The demodulated signal is supplied as the feedback signal to the differential amplifier 13.

As readily understood from the above description, the linear transmitter has a negative feedback loop which will be called a cartesian loop.

By the way, the cartesian loop becomes unstable when a phase shift occurs between the input signal and the feedback signal. More particularly, the cartesian loop may become to a positive feedback loop when the phase shift occurs between the input signal and the feedback signal. Such a phase shift occurs on the basis of a time delay in the cartesian loop and the other factors. When the cartesian loop becomes unstable, it is difficult to reduce an amplifier distortion in the linear power amplifier 16. Namely, it is difficult to improve a non-linear distortion of the transmission signal.

Furthermore, the differential amplifier 13 generally has an amplifier offset inherent in the differential amplifier 13. Similarly, the quadrature demodulator 18 generally has a demodulator offset inherent in the quadrature demodulator 18. The amplifier and the demodulator offsets may be collectively called a transmitter offset. On the basis of the amplifier and the demodulator offsets, it is difficult to obtain a good modulation characteristic in the conventional linear transmitter.

Figure 2:
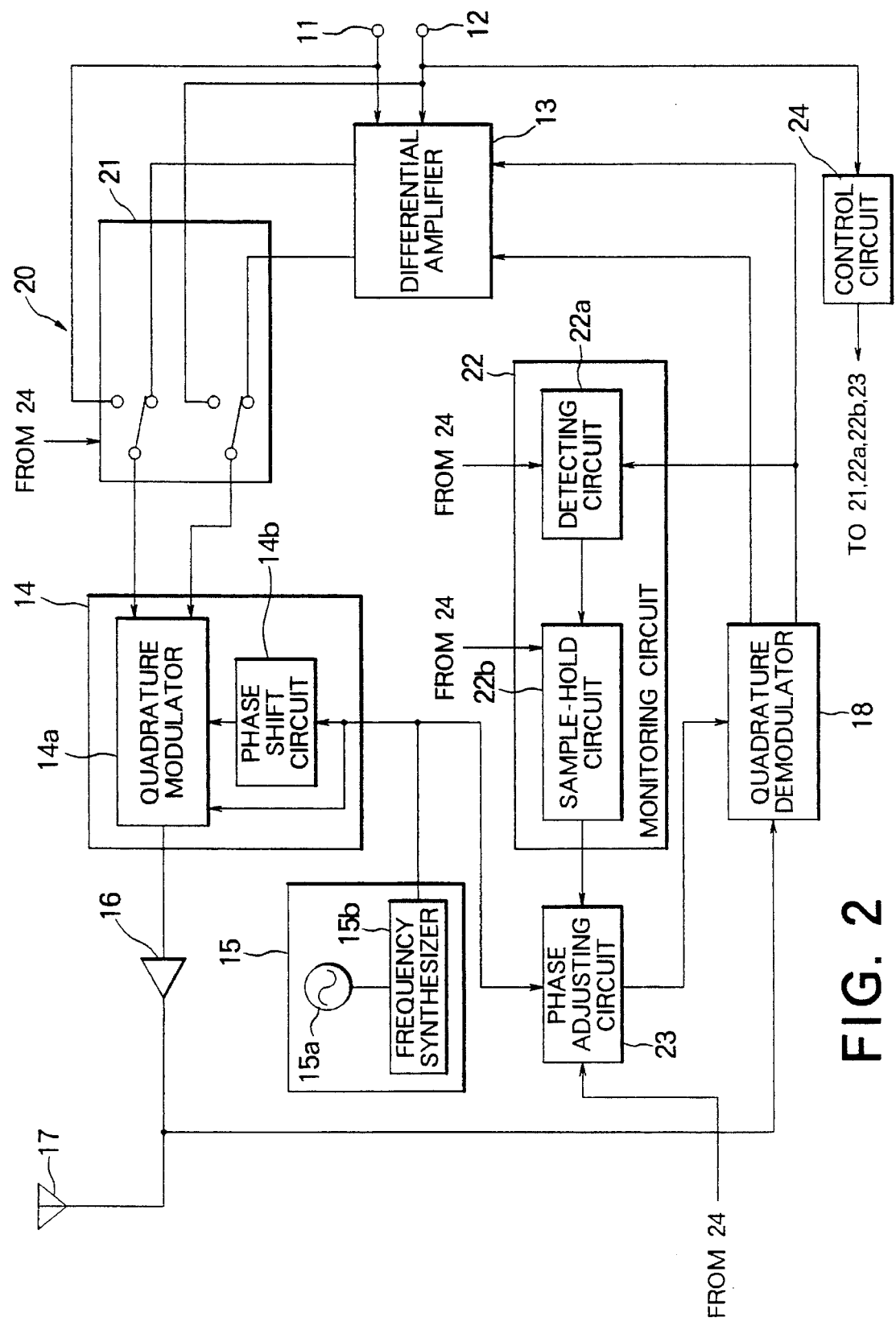
FIG. 2 is a block diagram of a linear transmitter according to a first embodiment of this invention.

Referring to FIG. 2, description will proceed to a linear transmitter according to a first embodiment of this invention. The illustrated linear transmitter is different in structure from the linear transmitter 10 illustrated in FIG. 1 and therefore designated afresh by a reference numeral 20. The linear transmitter 20 comprises similar parts which are designated by like reference numerals and are operable with likewise named signals. The linear transmitter 20 further comprises a switching circuit 21, a monitoring circuit 22, a phase adjusting circuit 23, and a control circuit 24, all of which will later be described.

As described in conjunction with FIG. 1, the input signal has the preamble signal at the first period and the information signal at the second period following the first period. The first period may be called a non-modulation period. The second period may be called a modulation period. In the example being illustrated, the preamble inphase component has a non-zero value. The preamble quadrature component has a zero value. More particularly, the preamble quadrature component is equal to the zero value.

The control circuit 24 is connected to the second input terminal 12. At a start of the preamble quadrature component equal to zero value, the control circuit 24 produces a first control signal, On the other hand, the control circuit 24 produces a second control signal at an end of the preamble quadrature component. Each of the first and the second control signals is supplied to the switching circuit 21, the monitoring circuit 22, and the phase adjusting circuit 23.

Responsive to the first control signal, the switching circuit 21 connects the quadrature modulator circuit 14 to the first and the second input terminals 11 and 12. As a result, the quadrature modulator circuit 14 is supplied with the preamble signal having the preamble inphase and the preamble quadrature components. In this event, the differential amplifier 13 is disconnected with the quadrature modulator circuit 14.

Responsive to the second control signal, the switching circuit 21 connects the quadrature modulator circuit 14 to the differential amplifier 13. As a result, a difference signal is supplied from the differential amplifier 13 to the quadrature modulator circuit As readily understood from the above description, the preamble signal is supplied to the quadrature modulator circuit 14 at the first period. The difference signal is supplied to the quadrature modulator circuit 14 at the second period. Although the preamble and the information signals are carried by the difference signal described in conjunction with FIG. 1, only the information signal is carried by the difference signal described in FIG. 2.

In a similar manner described in conjunction with FIG. 1, the quadrature modulator circuit 14 carries out quadrature modulation to produce the modulated signal. More particularly, the quadrature modulator circuit 14 quadrature modulates the preamble signal into the modulated signal carrying the preamble signal at first. Secondly, the quadrature modulator 14 quadrature modulates the difference signal into the modulated signal carrying the difference signal.

Figure 3:
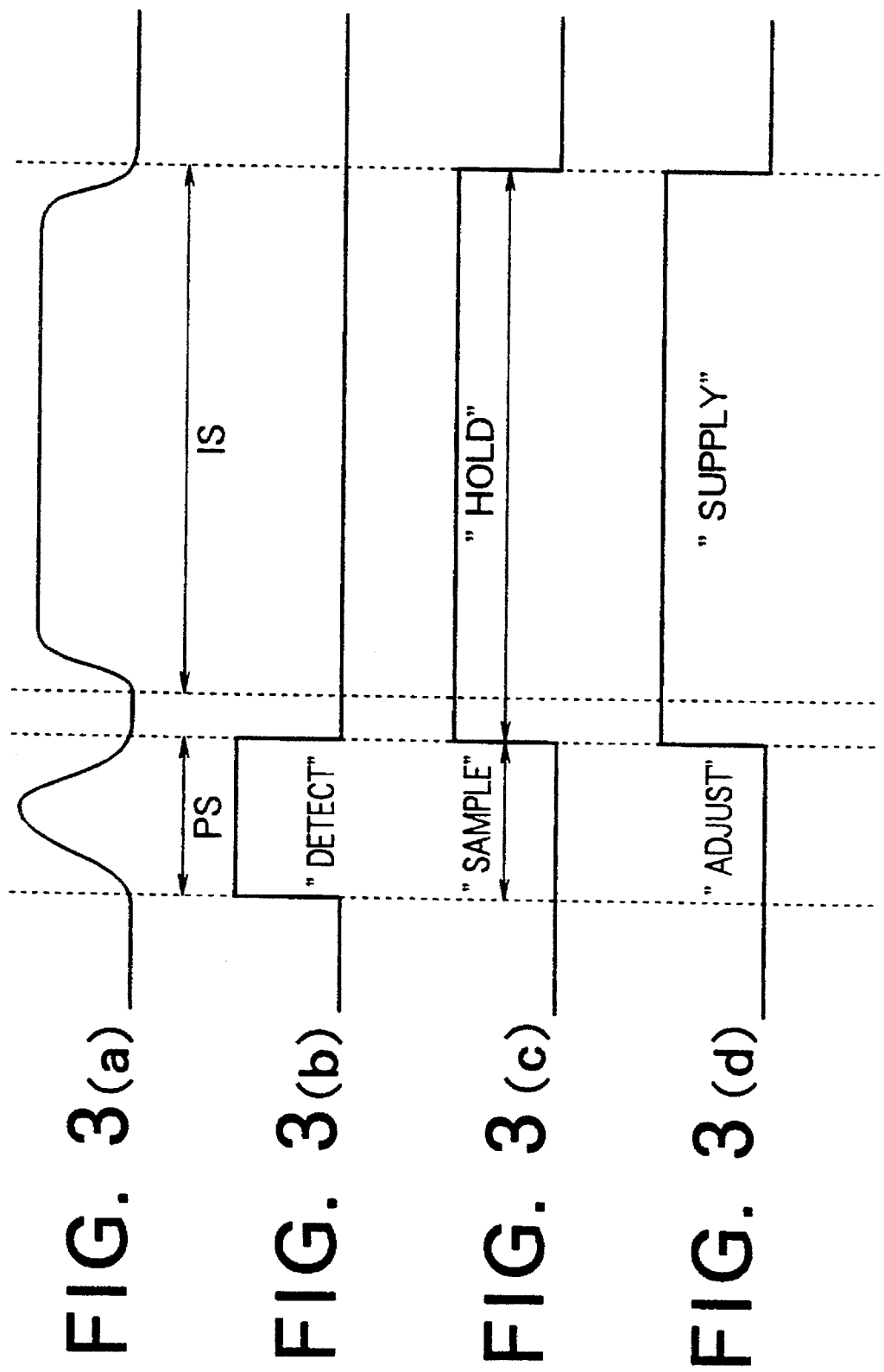
FIGS. 3(a) through 3(d) a timing chart for describing operation of the linear transmitter illustrated in FIG. 2.

Referring to FIGS. 3(a through 3(d) in addition to FIG. 2, the modulated signal is amplified into the transmission signal by the linear power amplifier 16 as described in conjunction with FIG. 1. The transmission signal is transmitted as the burst signal through the antenna 17 to the relay station. The transmission signal has a preamble signal part PS at the first period and an information signal part is at the second period as shown FIG. 3(a). Furthermore, the transmission signal is supplied to the quadrature demodulator 18.

The quadrature demodulator 18 quadrature demodulates the transmission signal into the demodulated signal in accordance with a phase adjusted carrier signal which is produced by the phase adjusting circuit 23 as will later be described. The demodulated signal is supplied as the feedback signal to the differential amplifier 13. The monitoring circuit 22 monitors the feedback quadrature component of the feedback signal. More particularly, the monitoring circuit 22 monitors a level of the feedback quadrature component during the first period to produce a level monitored signal representative of a monitored level.

In the example being illustrated, the monitoring circuit 22 comprises a detecting circuit 22a and a sample-and-hold circuit 22b. As described above, the monitoring circuit 22 is supplied with the first and the second control signals. Responsive to the first control signal, the detecting circuit 22a detects a level of the feedback quadrature component to produce a level detected signal representative of a detected level as shown at FIG. 3(b). The detecting circuit 22a stops detecting the level of the feedback quadrature component as shown at FIG. 3(b). Namely, the detecting circuit 22a detects the level of the feedback quadrature component to produce the level detected signal during the first period as shown at FIG. 3(b).

Responsive to the first control signal, the sample-and-hold circuit 22b samples the level detected signal to hold the detected level as a held level as shown at FIG. 3(c). Responsive to the second control signal, the sample-and-hold circuit 22b supplies the held level as the monitored level to the phase adjusting circuit 23 as shown at FIG. 3(c). Namely, the sample-and-hold circuit 22b samples the level detected signal to hold the detected level as the held level during the first period. The sample-and-hold circuit 22b supplies the held level as the monitored level to the phase adjusting circuit 23 during the second period.

The phase adjusting circuit 23 is further supplied with the carrier signal from the carrier signal producing circuit 15. The phase adjusting circuit 23 adjusts a carrier phase of the carrier signal in accordance with the monitored level during the first period to supply the quadrature demodulator 18 with the phase adjusted carrier signal as shown at FIG. 3(d). More specifically, the phase adjusting circuit 23 adjusts the carrier phase of the carrier signal in accordance with the monitored level when the first control signal is supplied with the phase adjusting circuit 23. For example, the phase adjusting circuit 23 adjusts the carrier phase of the carrier signal until the monitored level becomes to a predetermined level. The predetermined level may be equal to a zero level. Responsive to the second control signal, the phase adjusting circuit 23 supplies the phase adjusted carrier signal to the quadrature demodulator 18.

Figure 4:
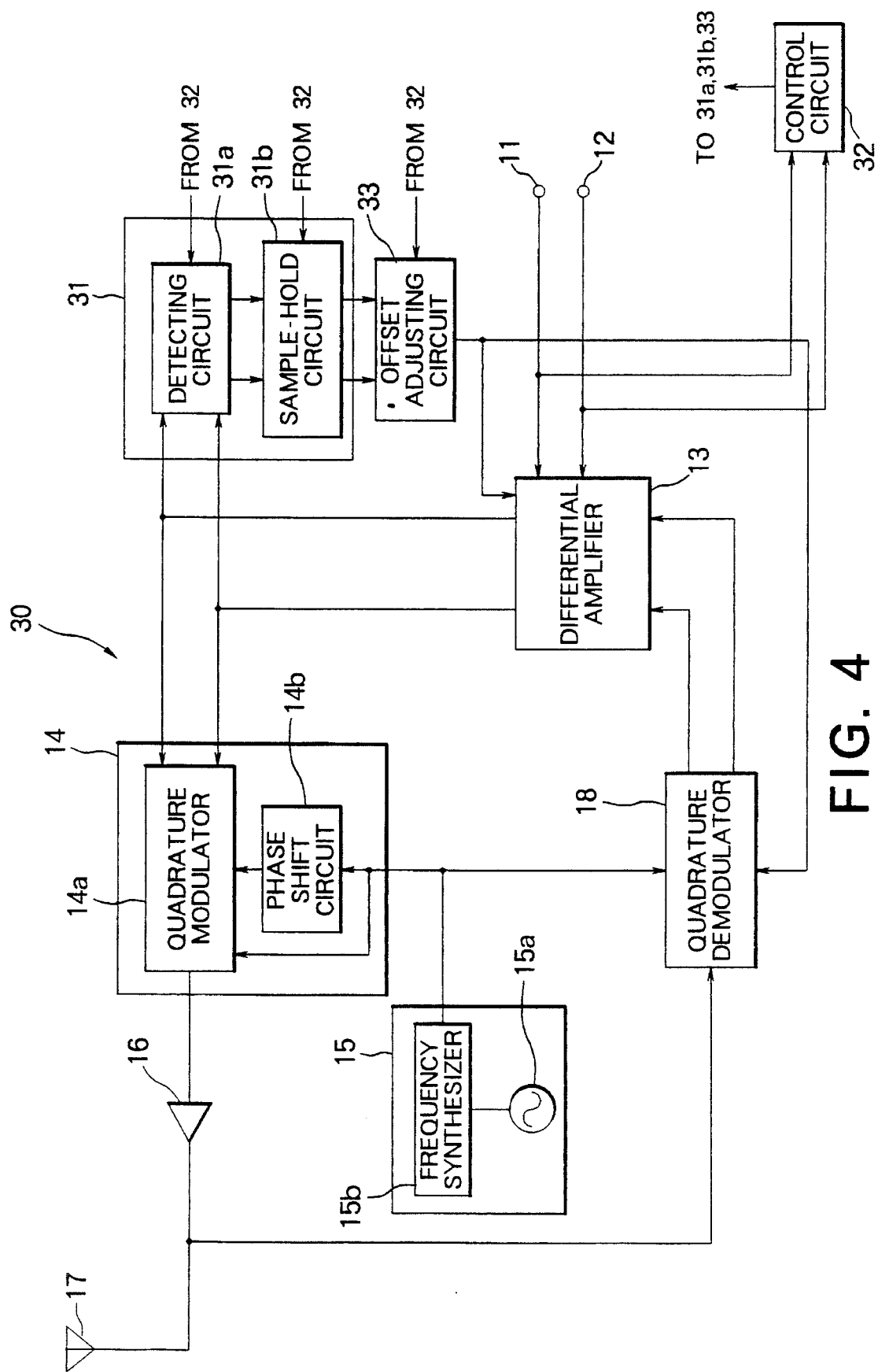
FIG. 4 is a block diagram of a linear transmitter according to a second embodiment of this invention.

Referring to FIG. 4, description will proceed to a linear transmitter according to a second embodiment of this invention. The illustrated linear transmitter is different in structure from the linear transmitter 10 illustrated in FIG. 1 and therefore designated afresh by a reference numeral 30. The linear transmitter 30 comprises similar parts which are designated by like reference numerals and are operable with likewise named signals. The linear transmitter 30 comprises a monitoring circuit and a control circuit which are different in structure from the monitoring circuit 22 and the control circuit 24, respectively. Therefore, the monitoring circuit and the control circuit are designated afresh by reference numerals 31 and 32 in FIG. 4, respectively. The linear transmitter 30 further comprises an offset adjusting circuit 33.

As described in conjunction with FIG. 1, the differential amplifier 13 has an amplifier offset inherent in the differential amplifier 13. Similarly, the quadrature demodulator 18 has a demodulator offset inherent in the quadrature demodulator 18. On the basis of the amplifier and the demodulator offsets, the modulation characteristic becomes bad in the linear transmitter 30. In order to obtain a good modulation characteristic, the linear transmitter 30 comprises the monitoring circuit 31, the control circuit 32, and the offset adjusting circuit 33, all of which will later be described.

Referring to FIG. 5, the burst signal is produced in accordance with the input signal as described in conjunction with FIG. 1. The burst signal is transmitted to the relay station in one of the time slots. A transmission period of the burst signal will be called a burst period BP. A remaining period except the burst period may be called a waiting or rest period RP. Namely, the burst signal is transmitted to the relay station at the burst period BP and is not transmitted to the relay station at the rest period RP as shown at FIG. 5(a).

Again referring to FIG. 4, the control circuit 32 is connected to the first and the second input terminals 11 and 12 and is supplied with the input signal having the input inphase and the input quadrature components. On the basis of a start and an end of the input signal, the control circuit 32 knows the burst period. At the start of the input signal, the control circuit 32 produces a primary control signal to supply the primary control signal to the monitoring circuit 31 and the offset adjusting circuit 33. At the end of the input signal, the control circuit 32 produces a secondary control signal to supply the secondary control signal to the monitoring circuit 31 and the offset adjusting circuit 33.

The monitoring circuit 31 is connected to the differential amplifier 13 and is supplied with the difference signal having the difference inphase and the difference quadrature components. It is to be noted that the differential amplifier 13 is supplied with a zero value signal having a zero value when the input signal is not supplied to the first and the second input terminals 11 and 12. Namely, the differential amplifier 13 is supplied with the zero value signal during the rest period RP. During the rest period RP, the differential amplifier 13 produces the difference signal in accordance with the zero value signal. The monitoring circuit 31 monitors a level of the difference signal in response to the secondary control signal to produce a level monitored signal representative of a monitored level. The monitoring circuit 31 stops monitoring the level of the difference signal in response to the primary control signal. Namely, the monitoring circuit 31 monitors the level of the difference signal during the rest period to produce the level monitored signal. More particularly, the monitoring circuit 31 monitors the level of each of the difference inphase and the difference quadrature components to produce the level monitored signal having first and second level signals. The first level signal is representative of the level of the difference inphase component. The second level signal is representative of the level of the difference quadrature component. In the example being illustrated, the monitoring circuit 31 comprises a detecting circuit 31a and a sample-and-hold circuit 31b.

Figure 5A:
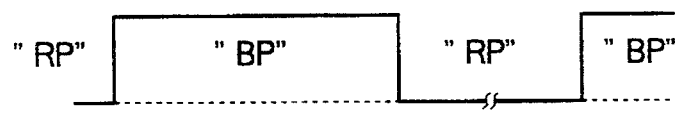
FIGS. 5(a) through 5(d) a timing chart for describing operation of the linear transmitter illustrated in FIG. 4.
Figure 5B:

Referring to FIG. 5 in addition to FIG. 4, the detecting circuit 31a detects the level of the difference signal in response to the secondary control signal to produce a level detected signal representative of a detected level as shown at FIG. 5(b). FIG. 5. The detecting circuit 31a stops detecting the level of the difference signal in response to the primary control signal as shown at FIG. 5(b). More specifically, the detecting circuit 31a detects the level of each of the difference inphase and the difference quadrature components during the rest period RP to produce the level detected signal having first and second detected level signals. The first detected level signal has a first detected level representative of a level of the difference inphase component. The second detected level signal has a second detected level representative of a level of the difference quadrature component. The level detected signal is supplied from the detecting circuit 31a to the sample-and-hold circuit 31b.

Figure 5C:
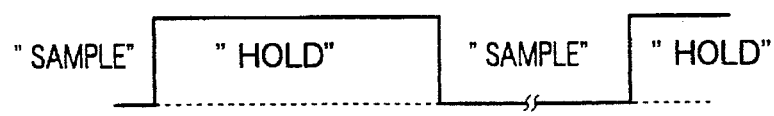
Figure 5D:

The sample-and-hold circuit 31b samples each of the first and the second detected level signals in response to the secondary control signal to hold the first and the second detected levels as first and second held levels, respectively, as shown at FIG. 5(c). Responsive to the primary control signal, the sample-and-hold circuit 31b supplies the first and the second held levels as the first and the second monitored levels to the offset adjusting circuit 33. Namely, the sample-and-hold circuit 31b samples each of the first and the second detected level signals to hold the first and the second detected levels as the first and the second held levels during the rest period RP. The sample-and-hold circuit 31b supplies the first and the second held levels as the first and the second monitored levels to the offset adjusting circuit 33 during the burst period BP.

Responsive to the secondary control signal, the offset adjusting circuit 33 adjusts the amplifier and the demodulator offsets in accordance with the first and the second monitored levels until each of the first and the second monitored levels becomes to a predetermined level, for example, a zero level. The offset adjusting circuit 33 stops adjusting the amplifier and the demodulator offsets in response to the primary control signal. Namely, the offset adjusting circuit 33 adjusts the amplifier and the demodulator offsets in accordance with the first and the second monitored levels during the rest period RP until each of the first and the second monitored levels becomes to the predetermined level.

Although illustration is not made, it is to be noted that it is easy to combine the linear transmitter 20 with the linear transmitter 30 from the first and the second embodiments in order to reduce amplifier distortion and to obtain the good modulation characteristic.

What is claimed is:

1. A linear transmitter for use in combination with a radio communication system of time division multiple access that has a plurality of radio stations each of which has said linear transmitter, said linear transmitter being for producing a transmission signal having transmission inphase and quadrature components in accordance with an input signal having input inphase and quadrature components during a predetermined period, wherein:

said input signal has a preamble signal at a first period and an information signal at a second period following said first period, said preamble signal having preamble inphase and quadrature components, said information signal having information inphase and quadrature components;

said linear, transmitter comprising:

quadrature modulating means for quadrature modulating a carrier signal by a supplied signal therein to produce said transmission signal;

differential amplifier means supplied with said input signal and a feedback signal having feedback inphase and quadrature components for producing a difference signal having difference inphase and quadrature components; switching means, connected to receive said preamble signal and said difference signal, for switching to select said preamble signal as said supplied signal during said first period and switching to select said difference signal as said supplied signal during said second period, wherein said supplied signal is supplied from said switching means to said quadrature modulating means;

quadrature demodulating means supplied with said transmission signal for quadrature demodulating said transmission signal into a demodulated signal in accordance with said carrier signal to produce said demodulated signal as said feedback signal;

monitoring means for monitoring a level of said feedback quadrature components during said first period to produce a level monitored signal representative of a monitored level; and phase adjusting means for adjusting a carrier phase of said carrier signal during said first period in accordance with said level monitored signal to produce an adjusted carrier signal, said phase adjusting means supplying said adjusted carrier signal as said carrier signal to said quadrature demodulating means.

2. A linear transmitter as claimed in claim 1, said differential amplifier means having an amplifier offset inherent in said differential amplifier means, said quadrature demodulating means having a demodulation offset inherent in said quadrature demodulating means, wherein said linear transmitter further comprises:

additional monitoring means for monitoring a level of said difference signal during said first period to produce an additional level monitored signal representative of an additional monitored level; and offset adjusting means for adjusting said amplifier and said demodulation offsets during said first period in accordance with said additional level monitored signal.

3. A linear transmitter as claimed in claim 1, wherein:

said differential amplifier means carries out subtraction between said input inphase component and said feedback inphase component to produce said difference inphase component, said differential amplifier means carrying out subtraction between said input quadrature component and said feedback quadrature component to produce said difference quadrature component.

4. A linear transmitter as claimed in claim 1, wherein:

said preamble inphase component has a non-zero value; and said preamble quadrature component having a zero value.

5. A linear transmitter as claimed in claim 1, wherein said monitoring means comprises:

detecting means for detecting said level of said feedback quadrature component during said first period to produce a level detected signal representative of a detected level; and holding means supplied with said level detected signal for holding said detected level as a held level during said first period, said holding means supplying said phase adjusting means with said held level as said level monitored signal during said second period.

6. A linear transmitter as claimed in claim 1, wherein said phase adjusting means adjusts the carrier phase of said carrier signal until said monitored level becomes to a predetermined level.

7. A linear transmitter as claimed in claim 6, wherein said predetermined level is equal to a zero level.

8. A linear transmitter as claimed in claim 1, wherein said quadrature modulating means comprises:

a quadrature modulating circuit for quadrature modulating said carrier signal by said supplied signal to produce a modulated signal; and a power amplifier for amplifying said modulated signal into an amplified signal to produce said amplified signal as said transmission signal.

9. A linear transmitter as claimed in claim 2, said supplied signal having supplied inphase and quadrature components, said modulated signal having modulated inphase and quadrature components, wherein said quadrature modulating circuit comprises:

a phase shift circuit for shifting a phase of said carrier signal by 90 degrees to produce a phase shifted carrier signal; and a quadrature modulator for quadrature modulating said carrier signal by said supplied inphase component to produce said modulated inphase component, said quadrature modulating circuit quadrature modulating said phase shifted carrier signal by said supplied quadrature component to produce said modulated quadrature component.

10. A linear transmitter for use in combination with a radio communication system of time division multiple access that has a plurality of radio stations each of which has said linear transmitter, said linear transmitter being for producing a transmission signal having transmission inphase and quadrature components in accordance with an input signal having input inphase and quadrature components during a burst period, said linear transmitter comprising:

quadrature modulating means for quadrature modulating a supplied signal therein into said transmission signal;

differential amplifier means, having an amplifier offset inherent in said differential amplifier means, for producing a difference signal, during said burst period and during a waiting period, having difference inphase and quadrature components in accordance with said input signal and a feedback signal having feedback inphase and quadrature components;

quadrature demodulating means having a demodulation offset inherent in said quadrature demodulating means for quadrature demodulating said transmission signal into a demodulated signal to produce said demodulated signal as said feedback signal;

monitoring means for monitoring a level of said difference signal during said waiting period to produce a level monitored signal representative of a monitored level; and offset adjusting means for adjusting said amplifier and said demodulation offsets during said waiting period in accordance with said level monitored signal.

11. A linear transmitter as claimed in claim 10, wherein:

said differential amplifier means carries out subtraction between said input inphase component and said feedback inphase component to produce said difference inphase component, said differential amplifier means carrying out subtraction between said input quadrature component and said feedback quadrature component to produce said difference quadrature component.

12. A linear transmitter as claimed in claim 10, wherein said monitoring means comprises:

detecting means for detecting said level of said difference signal during said waiting period to produce a level detected signal representative of a detected level; and holding means supplied with said level detected signal for holding said detected level as a held level during said waiting period, said holding means supplying said offset adjusting means with said held level as said level monitored signal during said burst period.

13. A linear transmitter as claimed in claim 10, wherein said offset adjusting means adjusts said amplifier and said demodulation offsets until said monitored level becomes to a predetermined level.

14. A linear transmitter as claimed in claim 13, wherein said predetermined level is equal to a zero level.

15. A linear transmitter as claimed in claim 10, wherein said quadrature modulating means comprises:

a quadrature modulating circuit for quadrature modulating a carrier signal by said difference signal to produce a modulated signal; and a power amplifier for amplifying said modulated signal into an amplified signal to produce said amplified signal as said transmission signal.

16. A linear transmitter as claimed in claim 15, said modulated signal having modulated inphase and quadrature components, wherein said quadrature modulating circuit comprises:

a phase shift circuit for shifting a phase of said carrier signal by 90 degrees to produce a phase shifted carrier signal; and a quadrature modulator for quadrature modulating said carrier signal by said difference inphase component to produce said modulated inphase component, said quadrature modulating circuit quadrature modulating said phase shifted carrier signal by said difference quadrature component to produce said modulated quadrature component.

* * * * *